(No Model.) 2 Sheets—Sheet 2.
M. L. ECKLES.
RIDING SADDLE.
No. 320,118. Patented June 16, 1885.
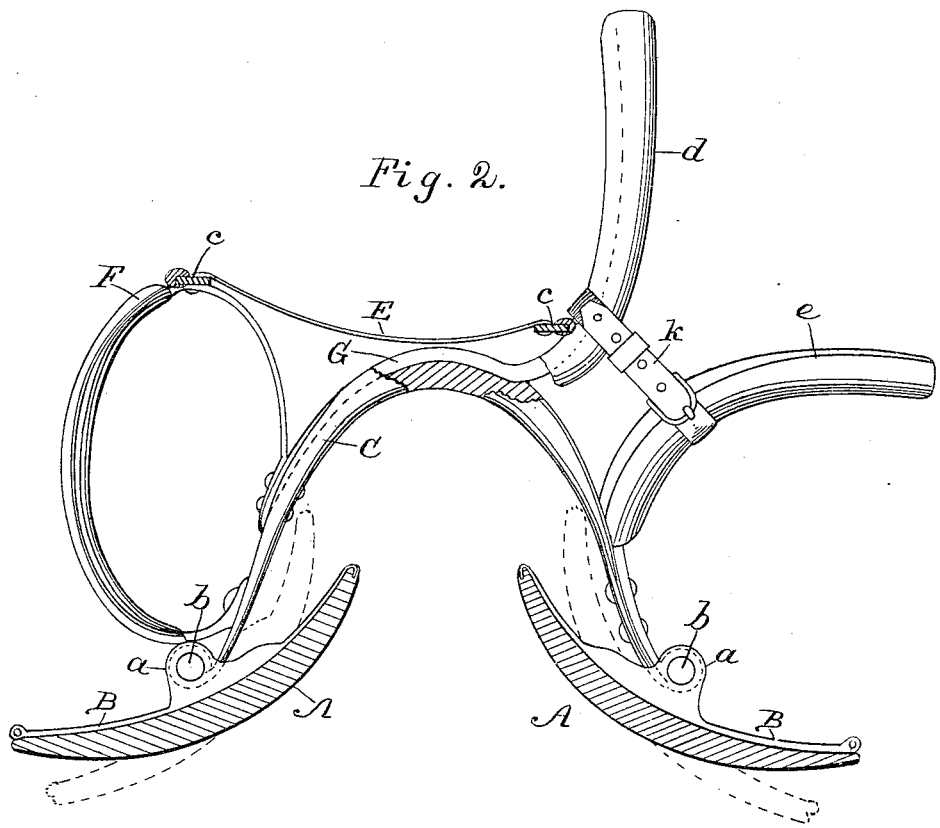
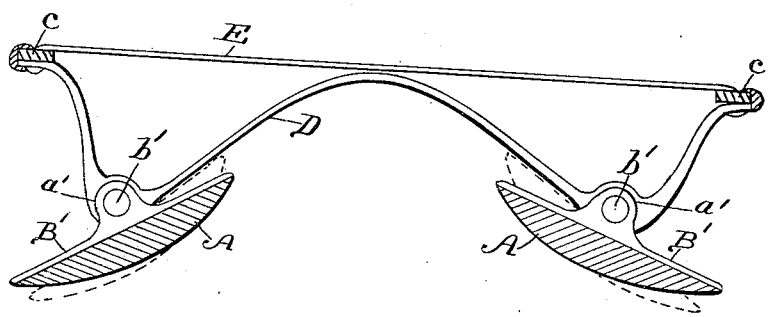
WITNESSES:
Thos. Houghton
Edw. W. Byrn
INVENTOR:
Myra L. Eckles
BY Munn & Co.
ATTORNEYS.

UNITED STATES PATENT OFFICE.

MYRA L. ECKLES, OF NORTHFIELD, MINNESOTA.

RIDING-SADDLE.

SPECIFICATION forming part of Letters Patent No. 320,118, dated June 16, 1885.

Application filed September 30, 1884. (No model.)

*To all whom it may concern:*

Be it known that I, MYRA L. ECKLES, a citizen of the United States, residing at Northfield, in the county of Rice and State of Minnesota, have invented certain new and useful Improvements in Saddles, of which the following is a description.

Figure 1:
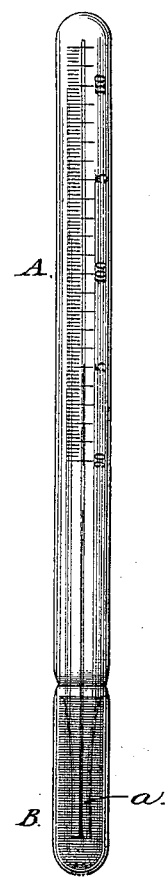
Figure 2:
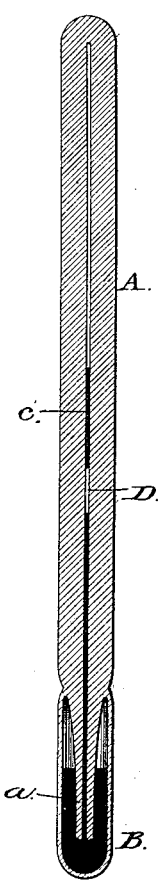

Figure 1 is a perspective view of the saddle. Fig. 2 is a section through the line $xx$ of Fig. 1, and Fig. 3 is a section through the line $yy$ of Fig. 1.

The object of my invention is to provide a form of saddle which shall better adapt itself to the different shapes or outlines of the horse in the varying positions assumed by the animal, or to the different shapes of different animals, thereby making the saddle more comfortable to the horse, permitting a freer action for the animal, and avoiding abrasions and sores.

My invention has special reference to side-saddles for ladies' use, but is applicable in part to men's saddles and pack-saddles as well.

I will now proceed to describe the construction whereby the objects of my invention are attained.

A A represent two concavo-convex saddle-trees, each of which curves upwardly from end to end, and also from side to side, the curve at the front end being more abrupt or decided than it is at the rear end, so as to conform to the anatomy of the horse's back. These saddle-trees may be made of simple hard wood, with or without a covering or padding. To the upper side of the front ends of each of these trees is riveted or otherwise fastened a metal bar, B, arranged transversely to the tree, and provided at its edges with upturned lugs $a\ a$. Between these lugs there is jointed upon a bolt, $b$, the lower ends of the front fork, C, which at its lower ends is formed with eyes-through which the bolts $b$ pass, and which forms a loose articulation, that allows the saddle-trees to rock on their longitudinal axes about this bolt as a center, thus adapting the saddle-trees to any slope or inclination of horse's back. At the rear ends of each of the trees a similar metal bar, B', is riveted, which has a similar set of upturned lugs, $a'\ a'$, with a hinge-bolt, $b'$, for loosely bringing the tree to the rear seat-support, D, which is made somewhat in the shape of the letter W, with its eyes formed in the lower branches and its outer ends bolted to and supporting the seat E, while its middle portion arches over from one saddle-tree to the other. The seat is composed of a marginal iron or steel frame, $c$, with a seat or filling of cane or other flexible material. Its forward end is supported upon and bolted to the front fork, C, and the brace F, which latter is in the nature of an oval or elliptical iron bolted to both the seat-frame and the fork and covered with leather, so as to form both a brace and a hand-hold.

The upper portion of the fork is hollowed out or concaved on its apex, and in it is laid a metal bar, G, that is bolted fast to the fork, and is extended up and upholstered or padded to form the upright horn $d$, which, with the downwardly-curved horn $e$, prevents the rider from falling off.

To the outer edges of each of the tree-sections are loosely attached two rings, $f f'$, one being held in an eye of the front metal bar, B, and the other being held in an eye of a metal cross-bar, $B^2$, attached to the tree at a point between the metal bars B and $B^2$. In the front one, $f$, of these rings is looped an adjustable leather strap, H, and in the rear one, $f'$, another adjustable leather strap, H'. Both these straps are connected with a ring, $g$, in the girth-strap I, and both of said straps H and H' are provided with buckles, buckle-tongue holes, and keepers, by which the said straps may be lengthened or shortened, as desired, and which adjustment permits the position of the girth to be changed farther to the front or rear, as occasion may require. Thus to throw the girth to the front the front strap, H, is shortened, and the rear one, H', is lengthened, and to throw it to the rear the rear one is shortened and the front one lengthened.

The stirrup J is provided with its usual adjustable strap, which is looped in the front ring.

Around the two horns is arranged a short strap, $k$, buckled tightly to strengthen and brace the horns against looseness.

This saddle can be upholstered and provided with skirts as completely as any saddle with- (No Model.)

F. EISSNER.
THERMOMETER.

No. 320,119.　　　　　Patented June 16, 1885.

Attest:
John A. Ellis
A. B. Moore

Inventor
Frederick Eissner
By David A. Burr
Atty.